US005290331A

United States Patent [19]

Miles et al.

[11] Patent Number: 5,290,331

[45] Date of Patent: Mar. 1, 1994

[54] LOCALIZED CLEAN AIR SYSTEM

[75] Inventors: Anthony W. Miles, Bath; Norman J. Wood, Sutton Benger; Guy A. Wilson, Lymington; Stephen C. Wilcox, Harrow, all of England

[73] Assignee: University of Bath, Bath, England

[21] Appl. No.: 788,092

[22] Filed: Nov. 5, 1991

[51] Int. Cl.[5] .................. B01D 50/00

[52] U.S. Cl. .................. 55/321; 55/333; 55/385.2; 55/418; 55/447; 55/473; 55/DIG. 29

[58] Field of Search .................. 55/97, 320, 321, 322, 55/333, 401, 407, 418, 447, 471, 472, 473, 500, 385.2, 412, DIG. 29

[56] References Cited

U.S. PATENT DOCUMENTS

| | | | |
|---|---|---|---|
| 3,185,181 | 5/1965 | Demyan | 55/418 X |
| 3,376,695 | 4/1968 | Muckley | 55/418 X |
| 3,385,036 | 5/1968 | Kiszko | 55/418 |
| 3,597,166 | 8/1971 | Hochman | 55/418 X |
| 3,749,130 | 7/1973 | Howitt et al. | 55/418 X |
| 3,776,121 | 12/1973 | Truhan | 55/DIG. 29 |
| 3,853,750 | 12/1974 | Volsy | 55/97 X |
| 3,923,482 | 12/1975 | Knab et al. | 55/DIG. 29 |
| 4,157,902 | 6/1979 | Tokar | 55/418 X |
| 4,202,676 | 5/1980 | Pelosi et al. | 55/418 X |
| 4,207,083 | 6/1980 | Gelhaar et al. | 55/418 |
| 4,967,320 | 10/1990 | Paschal | 362/96 |

FOREIGN PATENT DOCUMENTS

| | | | |
|---|---|---|---|
| 0229390 | 4/1959 | Australia | 55/DIG. 29 |
| 519145 | 2/1972 | Sweden . | |
| 2244126 | 11/1991 | United Kingdom . | |

*Primary Examiner*—Charles Hart

*Attorney, Agent, or Firm*—Brooks & Kushman

[57] ABSTRACT

A localized clean air system for operating theaters and a method of supplying clean air to a localized region in such situations. A fan is connected to a delivery head, which has an outlet for directing inlet clean air to the localized region in a particular pattern. A streamlined body is positioned in the outlet so that, in use, the clean air flows around the body and is modified thereby to form, immediately downstream of the body, an inner region of low velocity air encircled by an outer region of higher velocity air. Preferably, the streamlined body is symmetrical about its axis and is aligned with the clean air flow, for instance by being centrally positioned in the air outlet. The streamlined body preferably comprises a rounded head and a tapered tail. A diffuser is disposed in the clean air flow upstream of the streamlined body to minimize turbulence in the air flow.

23 Claims, 5 Drawing Sheets

VELOCITY PROFILES
OUTLET DIAMETER D, VELOCITY Vo

LOCALIZED CLEAN AIR SYSTEM

TECHNICAL FIELD

This invention relates to a method and apparatus for supplying clean air to a localized site or region and is of particular application in operating theaters, although other applications where a clean air environment is required, such as in the food or electronics industries, are not excluded.

BACKGROUND ART

It has been shown that the use of clean air systems in operating theaters dramatically reduces the occurrence of post-operative sepsis. Hence, the use of such systems is regarded as being highly desirable, especially in the case of operations in which body tissues are exposed for long periods of time, as for example in orthopaedic operations, or operations on patients that have deficient immune systems, for example, burn victims.

Conventional clean air systems involve the use of an enclosure that is placed around the operating table and that is supplied with sterile air. Operating staff in the enclosure wear body exhaust suits and full facial masks. Such systems, although effective, have not, however, been widely adopted because their installation and maintenance costs are extremely high and the clothing worn by the operating staff is regarded as being too restrictive and uncomfortable.

A number of alternative, localized clean air systems have been designed but these have also been found to be unsatisfactory in a number of respects. The main problem associated with such systems is that the clean air flow being supplied to the localized site entrains the surrounding unclean air and thus is contaminated by the time it reaches the localized site. Examples of localized clean air systems include devices that rest upon, and are sealed to, the patient's body and which blow clean air across the operative site. Such devices are restrictive to surgery and often fail due to ineffective seals. There are also devices that are suspended above the operating table and blow air downwards onto the operative site.

An example of the latter type of localized clean air system is disclosed in U.S. Pat. No. 3,923,482. The system comprises an air discharge head that is meant to discharge a central column of low velocity laminar flow air surrounded by a sheath of higher velocity air, which is supposed to prevent contaminated air being entrained into the central column. The central column of low velocity air is generated either by inserting a perforated sheet centrally in the airstream to retard the air flowing through it or by channelling the airstream into an outer, annular channel and a central channel, and decreasing and increasing the cross-sections of these, respectively, with distance downstream so as to create the desired velocity profile. In practice, however, both arrangements are unlikely to create the desired velocity profile.

It is an object of the present invention to provide an improved localized clean air system which generates an air flow comprising an inner region of low velocity air and an outer region of higher velocity air.

It is a further object of the invention to provide an inexpensive localized clean air system for use in operating theaters that is not obstructive to surgery, that delivers a clean air flow to the operative site, and that is of comparable efficiency to the conventional, enclosure-type clear air supply systems.

SUMMARY OF THE INVENTION

The invention provides a localized clean air system comprising means for generating or receiving an air flow and a delivery head provided with an air outlet in which a streamlined body is so positioned that, in use, the air flow passes around the body and is modified thereby to form, immediately downstream thereof, an inner region of low velocity air and an outer region of higher velocity air. The head of the streamlined body causes the initial generation of the outer region of higher velocity air and the presence of the tail results in the generation of the inner region of lower velocity air. The faster moving air will tend to entrain the inwardly disposed, adjacent slower flowing air, thereby causing a mass transfer of air outwards from the inner region of air. That mass transfer will be in the opposite direction to any particles of unclean air travelling inwardly and thus will successfully prevent the inner region of air from being contaminated. Furthermore, the streamlined body generates an air flow that is substantially turbulence free and thus, the velocity differential will be maintained for a considerable distance downstream before decaying. It should be understood that the term "streamlined body" as used herein includes a body having a few discontinuities that cause only limited and localized disruption to the air flow; for example, the tail may be truncated near its end without substantially disrupting the air flow.

Preferably, the velocity profile immediately downstream of the streamlined body contains no velocity discontinuities. Advantageously, the air flow is modified by the body to form, immediately downstream thereof, an outer sheath of higher velocity air surrounding an inner core of lower velocity air so that the lower velocity air is protected from contamination from all directions.

The streamlined body will preferably be symmetrical about its axis and will be aligned with the direction of the air flow. The body may, however, be asymmetrical and/or inclined at an angle to the direction of flow. Conveniently, the streamlined body is centrally positioned in the air outlet. Advantageously, the streamlined body comprises a rounded head and a tapered tail, downstream thereof. Preferably, the maximum cross-sectional area of the head is about 20% to 95% of the cross-sectional area of the air outlet. Advantageously, the included tail angle lies within the range of from 10° to 60°.

The localized clean air system either has means for receiving an air flow, for example, from an external source such as a ventilation system, or, it is provided with means for generating an air flow, a fan being preferred.

Where clean air is being supplied to a highly contaminated environment, the clean air may be provided merely from outside that environment. Alternatively, the air may be cleaned before being supplied to the localized clean air system, or the system may itself include filtration means. The filtration means may comprise a prefilter and a final filter. The prefilter is preferably positioned at the air inlet of the apparatus. The final filter is preferably positioned as far downstream as possible so that the air, upon leaving it, is not further contaminated by apparatus downstream thereof. Ideally, the final filter is positioned immediately upstream of the streamlined body.

The system may also include flow smoothing means disposed, in use, in the air flow upstream of the streamlined body, which means have the effect of reducing any turbulence in the air flow so that it arrives at the upstream surface of the streamlined body in a controlled manner. The flow smoothing means may comprise an air-straightening grid; for example, air from a fan may be passed through such a grid so as to reduce any turbulence caused by the fan.

If the dimensions of the apparatus widen so that the air flow is caused to expand, for example, where the air flow is supplied to a delivery head from narrow ducting, then the localized clean air system may include a diffuser positioned at the point where the air flow is expanding. Where it is necessary for the air flow to expand significantly in as short a distance as possible the diffuser may be a multicell diffuser comprising a plurality of diffuser elements; the diffuser elements may be concentrically arranged. Preferably, the multicell diffuser has a total included angle of up to 45° and the individual diffuser elements are separated by angles of up to 8°.

If the system is provided with its own means for generating the air flow, those means may be remote from the delivery head, thereby providing better air recirculation than if the air inlet and outlet are in close proximity. Furthermore, a lower level of noise will be experienced in the vicinity of the delivery head. Alternatively, a system including such means may be contained in a single piece of apparatus so as to be compact and portable.

The invention also provides a delivery head for a localized clean air system as described above.

The invention further provides a method for supplying clean air to a localized region using the system described above.

The velocity profile will flatten with distance downstream from the air outlet and the system may be arranged so that the velocity profile becomes substantially flat in the vicinity of the localized region, so that the air in that region is travelling at a uniform velocity, which may be selected to be a particular velocity.

The method may be used in an operating theater where clean air is being supplied to the operative site of a patient. In such an application, the air in the localized region is preferably travelling at about 0.2 to 0.6 m/s, in which velocity range the following criteria should be fulfilled:

i) displace any convection currents of unclean air;
ii) avoid excessive drying of the wound;
iii) avoid physically damaging the wound;
iv) allow operating staff to operate unhindered;
v) sweep away from unclean air carried inwardly by the surgeon's movements; and
vi) neither excessively heat nor cool the wound.

Ideally, the delivery head is so positioned as to deliver the air flow downwards. For downward air flow, as opposed to horizontal air flow, the air flow velocity need only be about 0.3 m/s to control vertical convection currents and any contaminants are carried down to the floor rather than contaminating the operative team; furthermore, the movements of the operating staff need not be restricted so as to avoid the delivery head or clean air flow.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

Two embodiments of the invention will now be described in greater detail by way of example only, with reference to the accompanying drawings, of which.

BEST MODE FOR CARRYING OUT THE INVENTION

Figure 1:
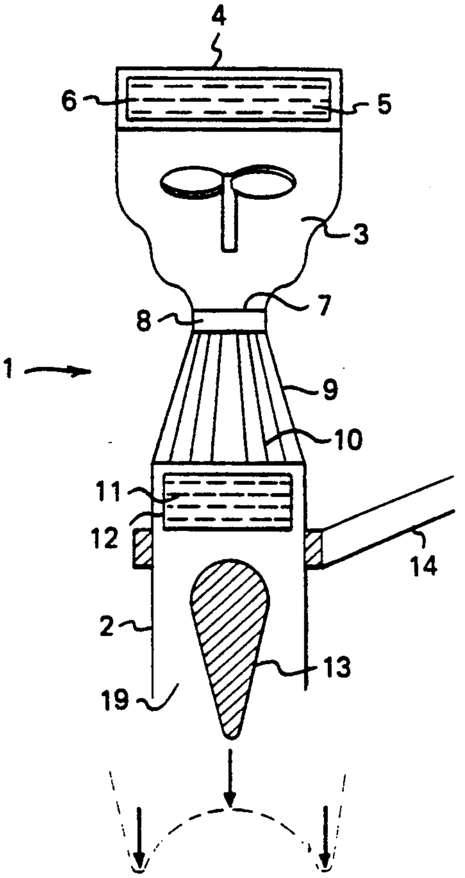
FIG. 1 is a schematic sectional view of a compact localized clean air system, and shows the velocity profile immediately downstream of the delivery head.

The localized clean air system of FIG. 1, indicated generally by the reference numeral 1, is for use in an operating theater and comprises a single piece of apparatus containing a delivery head 2 and means for generating or receiving an air flow, such as a fan 3, which apparatus would be supported above an operating table.

The fan inlet 4 is located at the upper end of the apparatus, facing toward the ceiling, and has a prefilter 5 mounted across it. The prefilter 5 is enclosed in a detachably mounted casing 6 and preferably has a depth of about 75 mm and a square face of side about 300 mm. The prefilter 5 is provided to increase the life of the final filter 11 (an HEP filter) and thus is selected to be at least 90% efficient in filtering out particles of size 5 μm and above, to have a low pressure resistance, a long life, and to be of a type that does not shed material.

The fan 3 may be a tube fan or a radial fan, although a tube fan is preferred in view of its smaller size, lighter weight and lower noise level; furthermore, a tube fan generates a straight air flow and can be installed in any position. The fan 3 is made of a plastic material and is thus corrosion resistant. The fan outlet 7 preferably has an exit diameter of about 300 mm and is connected by means of a connection collar 8 to the inlet of a flow smoothing means, such as diffuser 9.

A control system (not shown) is connected in series with the junction box (also not shown) of the fan 3 to control the fan speed, and is mounted externally away from the clean air flow. The control system may be a five step speed or continuously adjustable control system and may also be designed to compensate automatically for a pressure increase across the filters 5, 11 so as to maintain a constant air flow velocity.

The air outlet of the delivery head 2 preferably has a specifically selected exit diameter of about 400 mm and hence, the diffuser 9 is provided with inlet and outlet diameters preferably of about 200 mm and about 400 mm, respectively, so as to cause the air flow to expand to the desired diameter of approximately 400 mm in a controlled manner.

Figure 3A:
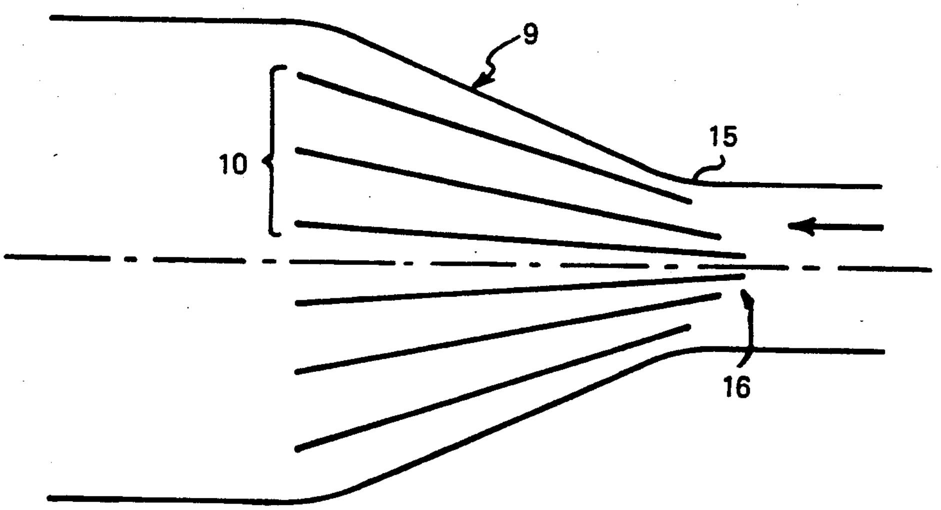
FIGS. 3A and 3B are respectively enlarged sectional and end views of the multicell diffuser of FIG. 1.
Figure 3B:
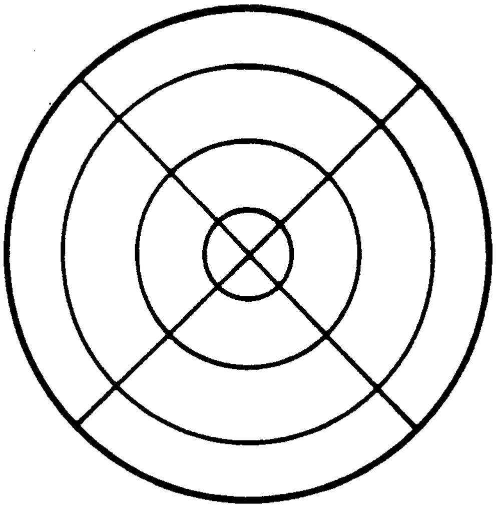

Referring to FIGS. 3A and 3B, the air straightening grid on diffuser 9 is a multicell diffuser comprising three concentric diffuser elements 10 which have included angles of about 7.5° between the adjacent surfaces, the central diffuser also having an included angle of about 7.5°; the total included angle of the multicell diffuser, including the delivery head housing, is approximately 45°. The multicell diffuser is provided with a blend inlet 15 and a "lead-in" 16. The inlet and outlet area ratios of the annular channels defined by the adjacent diffuser elements are matched in order to retain an unchanged velocity profile.

The final filter 11 is positioned in the delivery head 2 across the downstream end of the multicell diffuser 9. The filter 11 is sealed preferably by polyurethane into an extruded aluminum casing 12 and is protected by an aluminum mesh. Preferably, a 6 mm neoprene gasket is placed on both sides of the casing 12 and is precisely compressed by means of a bolt and bush arrangement to a thickness preferably of 3 mm so as to ensure an effective seal. The filter 11 is a "standard" HEPA (high efficiency particulate filtration) filter and has a "mini-pleat" construction, i.e. a pleated microglass media filter bonded with thin glass thread. Such a construction enables the filter 11 to withstand pressure drops of up to three to four times the initial pressure drop, caused by the filter retaining airborne particles, without any loss in filtration performance. It is, however, desirable to replace the HEPA filter once the filter pressure resistance doubles from its initial value, in view of the increased fan noise that will otherwise be associated with the increase in fan speed required to maintain the desired flow rate; this will usually mean the filter 11 has an effective operating life of about 12 to 18 months. A filter pressure differential measuring system (not shown) monitors the pressure resistance and comprises a Dwyer Magnehelic gauge and pressure switch which, upon activation, trips an alarm or light, thereby alerting the operating staff to the expiry of the filter.

Figure 4:
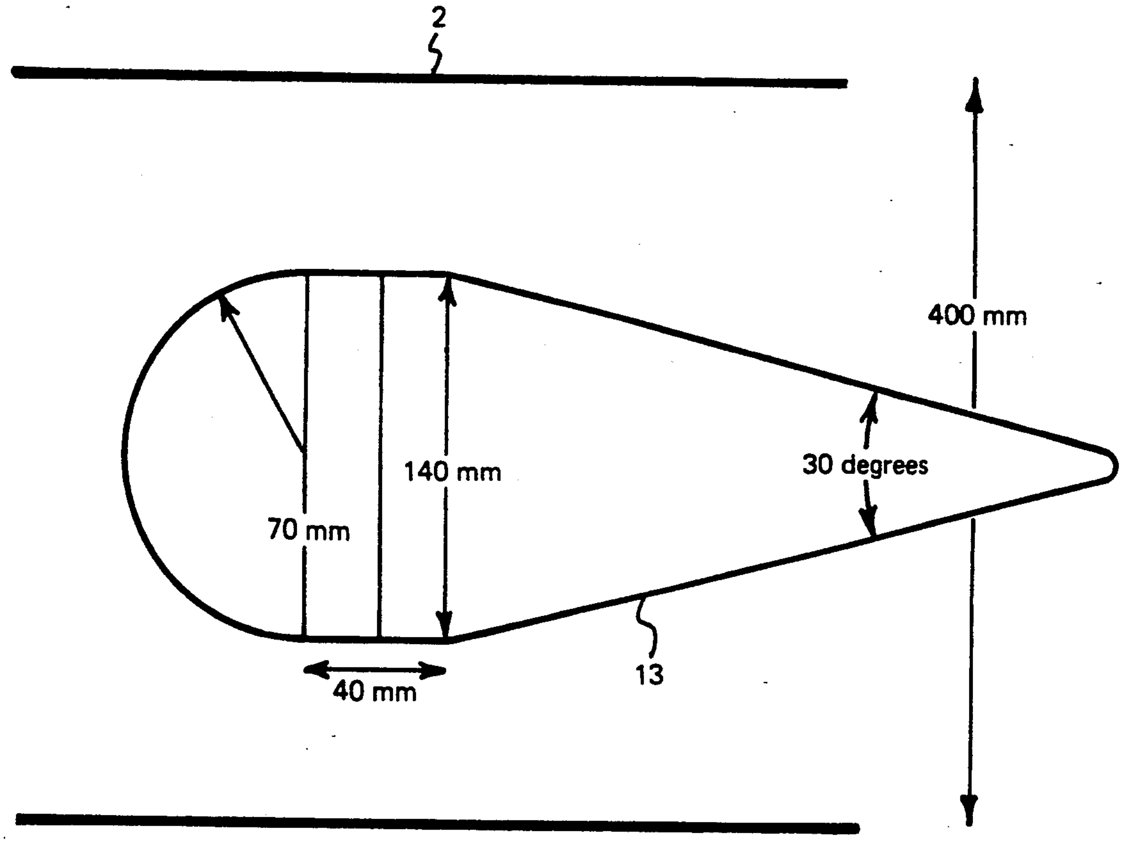
FIG. 4 is an enlarged sectional view of the streamlined body of FIG. 1.

A streamlined body 13 is supported coaxially by three radially extending struts (not shown) in the open end of the delivery head 2, as shown in greater detail in FIG. 4. The body 13 has a hemi-spherical head preferably of diameter 140 mm, a cylindrical middle portion preferably of length 40 mm and a conical tail of included angle 30° with a rounded point. The streamlined body 13 preferably is made from a material that is light, easily machinable and cleanable, does not shed material and has a low water absorption, such as spun aluminum or Ultra High Molecular Weight Polyethylene.

A centering and measuring system (not shown) is also provided on the delivery head 2. It comprises two "pencil" lights so positioned on the outside of the delivery head 2 that they each shine at a slight angle (which is adjustable) toward the axis of the delivery head. The center of the clean air flow at the optimum distance will be where the light beams cross, each light beam comprising a focused conventional white light producing an arrow head image (so that when the light beams are not co-incident the arrows point away from or toward one another).

The delivery head 2 is supported by a supporting arm 14, the structure of which preferably resembles a typical theater support light mechanism, so that it is fully maneuverable and may be adjusted into a desired position in which it will remain, without drifting therefrom; detachable, sterilizable handles should be provided for manoeuvering the delivery head.

In operation, the delivery head 2 is mounted on the supporting arm 14 and is positioned, using the centering and measuring system, preferably at a height of 1200 mm above the operating table, in such an orientation that the clean air flow is supplied to a protected zone preferably of about 400 mm diameter centered on the operative site. The fan 3 is switched on and its speed adjusted so that the air flow arrives at the operative site travelling at a uniform velocity within a range of between about 0.2 to 0.6 m/s.

Figure 5:
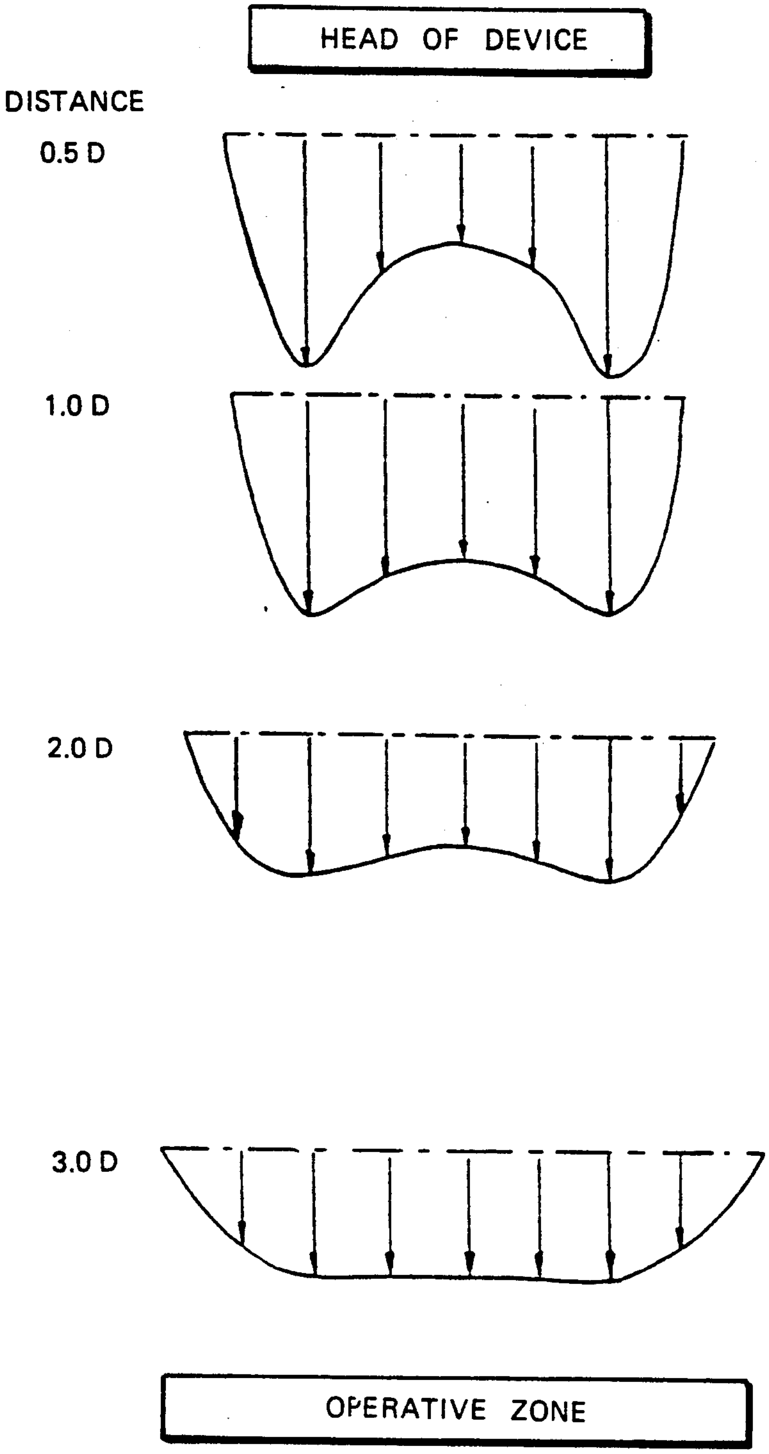
FIG. 5 shows schematically how the airstream velocity profile varies with distance downstream for the system of FIG. 1.

FIG. 5 shows the velocity profile of the air flow, in descending order, at distances of 0.5D, 1D, 2D and 3D, respectively, downstream of the air outlet, where D is the diameter of the air outlet. It will be seen that the air leaving the delivery head comprises low velocity air surrounded by higher velocity air, the velocity profile being continuous. The outer, higher velocity air slows with distance downstream so that the velocity profile becomes substantially flat at the operative site.

Figure 6:
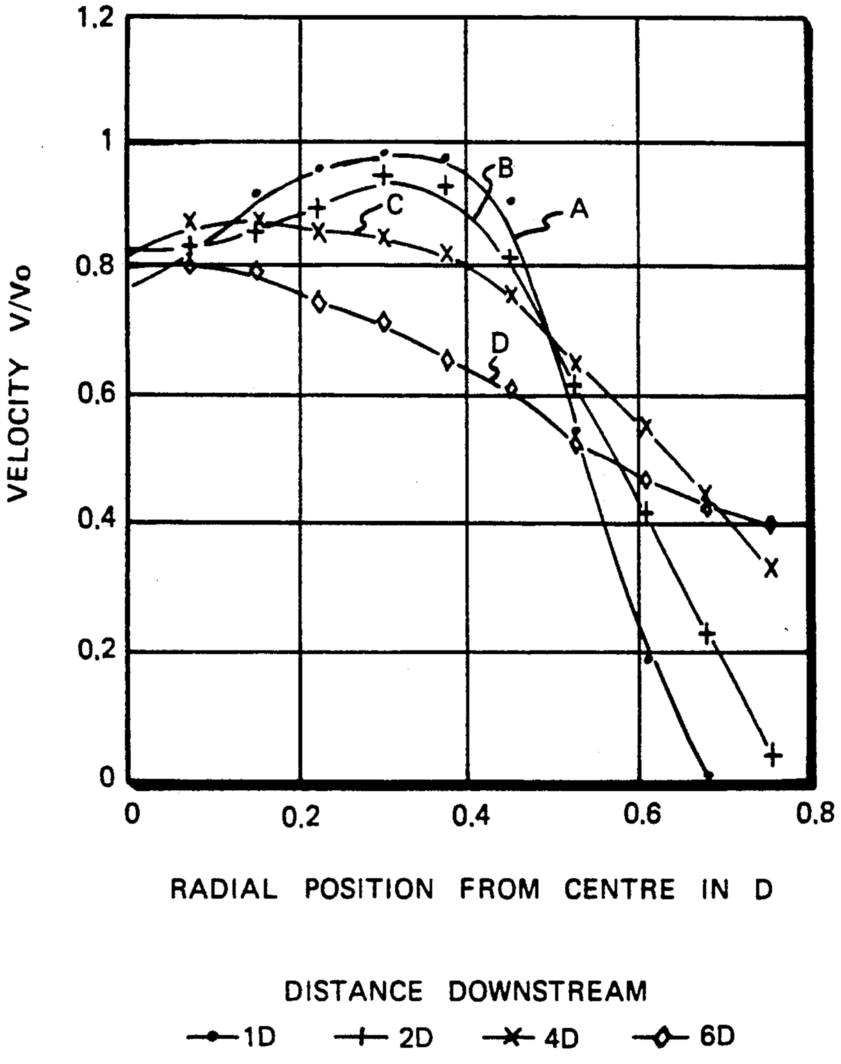
FIG. 6 is a graph of velocity against radial position from the centerline for a prototype system.

The characteristics of the air flow are a result of the choice of air outlet diameter and the size, shape and position of the streamlined body relative to the air outlet, and may be altered to suit the particular application. As an example, FIG. 6 shows a graph of air flow velocity V/Vo (Vo being the maximum air flow velocity at the air outlet) against radial position from the centerline, in terms of D, the air outlet diameter, for an air flow emerging from a prototype system similar to that of FIG. 1. The profiles A, B, C and D were derived from experimental readings taken at 1D, 2D, 4D and 6D, respectively, downstream of the air outlet, using an air outlet diameter D of 66 mm.

Figure 2:
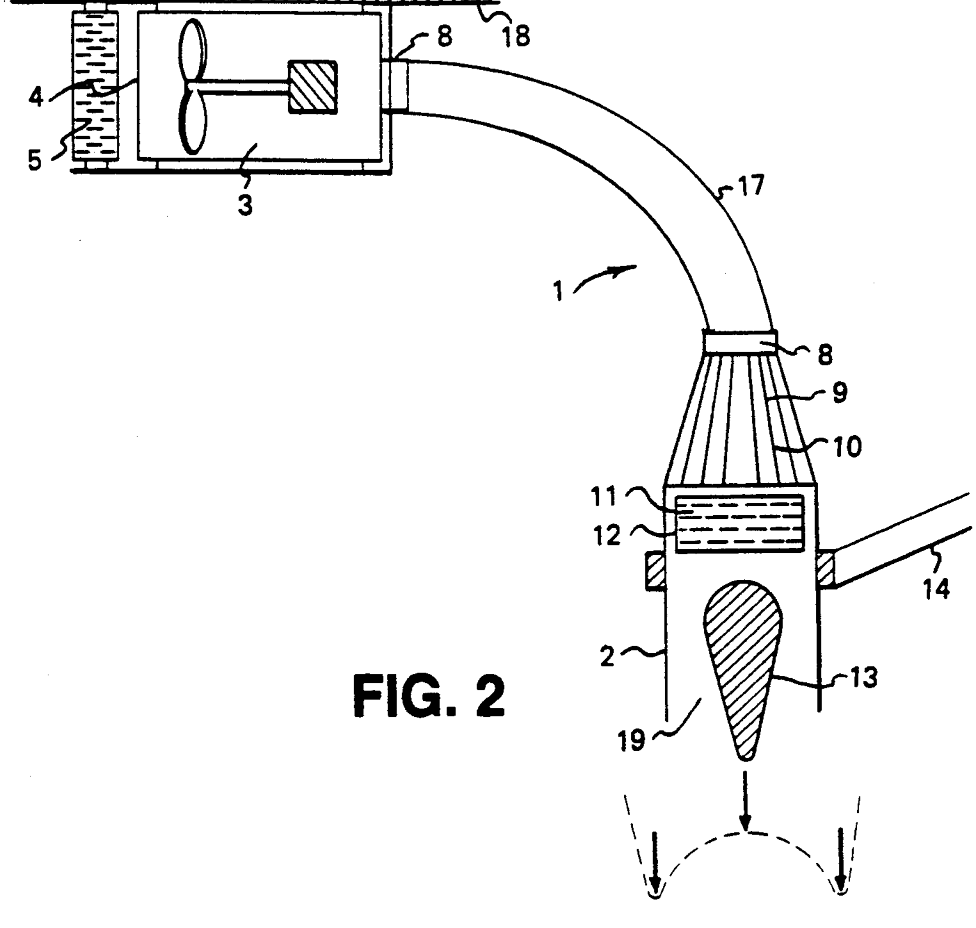
FIG. 2 is a schematic sectional view of a ceiling mounted localized clean air system, and shows the velocity profile immediately downstream of the delivery head.

FIG. 2 illustrates an alternative embodiment of the invention in which a tube fan 3 is remote from the air delivery head 2, being attached to a ceiling 18, and is connected to the delivery head by flexible ducting 17 preferably of 200 mm diameter, which is made from galvanized steel or aluminum. The ducting 17 inevitably restricts the movements of the delivery head 2 and increases the pressure resistance of the system, thereby increasing the noise of the fan 3; furthermore, the apparatus is not as portable as the system of FIG. 1. The remote position of the fan 3, however, does have the advantages that, for example, in an operating theater the fan 3 will be less of a disturbance to the operating staff and will ensure a more efficient recirculation of the air in the theater.

With reference to the multicell diffuser, it would be possible to change the area ratios of the annular channels defined by the concentric diffuser elements, so that the air flow arriving at the upstream side of the streamlined body already contains a sheath of slightly higher velocity air.

It will be appreciated that alternative forms of the invention, to those described above, may be employed, depending on the particular application.

What is claimed is:

1. A localized clean air system comprising:

means for generating an air flow from an air inlet to an external localized region;

a delivery head provided with an air outlet having an exhaust aperture directed towards said localized region, said delivery head being in communication with said means for generating the air flow;

a streamlined body having a head and a tail of diminishing cross-sectional area extending downstream along a longitudinal axis, said body being positioned in said air outlet so that the air flow passes around said streamlined body and is modified thereby to form downstream thereof, an inner region of low velocity air and an outer region of higher velocity air with the overall air flow being substantially turbulence free.

2. A localized clean air system as in claim 1 wherein the air flow is modified by the body to form, immediately downstream thereof, the outer region higher velocity air which surrounds the inner region of lower velocity air.

3. A localized clean air system as in claim 1 wherein the streamlined body is symmetrical about its axis and is aligned with the direction of the air flow.

4. A localized clean air system as in claim 1 wherein the streamlined body is centrally positioned in the air outlet.

5. A localized clean air system as in claim 1 wherein the streamlined body comprises a rounded head and a tapered tail.

6. A localized clean air system as in claim 5 wherein the maximum cross-sectional area of the head is from 20% to 95% of the cross-sectional area of the air outlet.

7. A localized clean air system as in claim 5 wherein the included angle of the tapered tail lies within the range from 10° to 60°.

8. A localized clean air system as in claim 1 wherein the means for generating the air flow comprises a fan.

9. A localized clean air system as in claim 1 further including filtration means disposed therewithin.

10. A localized clean air system as claimed in claim 9 wherein the filtration means comprises a prefilter associated with the means for generating an air flow and a final filter associated with the delivery head.

11. A localized clean air system as in claim 10 wherein the prefilter is positioned adjacent the air inlet of the system.

12. A localized clean air system as in claim 10 wherein the final filter is positioned immediately upstream from the streamlined body.

13. A localized clean air system as in claim 1 wherein the localized clean air system further includes a flow smoothing means disposed in the air flow upstream from the streamlined body, for reducing a turbulence in the air flow.

14. A localized clean air system as in claim 13 wherein the flow smoothing means comprises an air-straightening grid.

15. A localized clean air system as in claim 1 further including dimensional change which cause the air flow to expand and a diffuser positioned adjacent the region in which the air flow is expanding.

16. A localized clean air system as in claim 15 wherein the diffuser is a multicell diffuser comprising a plurality of diffuser elements.

17. A localized clean air system as in claim 16 wherein the diffuser elements are concentrically arranged.

18. A localized clean air system as in claim 16 wherein the individual diffuser elements are separated by angles of up to about 8°.

19. A localized clean air system as in claim 16 wherein the multicell diffuser has a total included angle of up to about 45°.

20. A localized clean air system as in claim 1 wherein the means for generating the air flow is remote from the delivery head.

21. A localized clean air system as in claim 1 wherein the means for generating the air flow is disposed adjacent to the delivery head.

22. A delivery head for a localized clean air system for delivering air to an external localized region, the delivery head comprising an air outlet positioned at a downstream end thereof for directing air to the external localized region, a streamlined body positioned in the air outlet for forming an outer sheath of higher velocity air which surrounds an inner region of lower velocity air, said streamlined body having a head and a tail of diminishing cross-sectional area extending downstream along a longitudinal axis, with the overall air flow being substantially turbulence free, and a final filter located upstream from the body;

wherein the higher velocity air will tend to entrain the inwardly disposed, adjacent lower velocity air, thereby causing a mass transfer of air outward from the inner region of air as the air exits the air outlet into the external localized region.

23. A localized clean air system comprising:

means for generating an air flow;

a delivery head provided with an air outlet in communication with the air flow generating means;

a filtration means for filtering the air in communication with the air flow generating means;

a flow smoothing means to reduce turbulence in the air flow, the flow smoothing means being associated with the delivery head; and a streamlined body having a head and a tail of diminishing cross-sectional area, the tail extending downstream along a longitudinal axis, said body positioned in said air flow downstream of said flow smoothing means, around which body the air flow passes and by which it is modified to form, downstream thereof, a moving column of air comprising an inner region of low velocity air and an outer region of higher velocity air.

* * * * *